(12) United States Patent
Aksyuk et al.

(10) Patent No.: US 7,253,550 B2
(45) Date of Patent: Aug. 7, 2007

(54) TORSIONAL ELECTROSTATIC ACTUATOR

(75) Inventors: Vladimir Anatolyevich Aksyuk, Westfield, NJ (US); Maria Elina Simon, New Providence, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 3 days.

(21) Appl. No.: 11/140,313

(22) Filed: May 27, 2005

(65) Prior Publication Data

US 2006/0267449 A1   Nov. 30, 2006

(51) Int. Cl.
  *H02N 1/00*    (2006.01)
  *G02B 26/08*   (2006.01)
(52) U.S. Cl. ............... 310/309; 318/116; 359/225
(58) Field of Classification Search .......... 310/309; 318/116
  See application file for complete search history.

(56) References Cited

U.S. PATENT DOCUMENTS

| | | | |
|---|---|---|---|
| 6,593,677 B2 * | 7/2003 | Behin et al. ............ | 310/309 |
| 6,760,144 B2 * | 7/2004 | Hill et al. ............ | 359/290 |
| 6,791,735 B2 * | 9/2004 | Stappaerts ............ | 359/245 |
| 6,872,947 B1 | 3/2005 | Greywall ............ | 250/339.13 |
| 7,081,982 B2 * | 7/2006 | Shimazu et al. ............ | 359/298 |
| 7,088,493 B2 * | 8/2006 | Alain et al. ............ | 359/291 |
| 2004/0140733 A1 * | 7/2004 | Keller ............ | 310/309 |

* cited by examiner

*Primary Examiner*—Burton Mullins
(74) *Attorney, Agent, or Firm*—Eugene J. Rosenthal

(57) ABSTRACT

Multiple drives are coupled together to cause rotation about a single axis by an arrangement in which two moveable electrode plates flank a fixed electrode plate such that the opposite direction rotations of the two moveable electrode plates are combined. To this end, at least one arm from at least one of the moveable electrode plates is connected to at least one arm of a moveable electrode plate on the opposite side of the fixed electrode plate, e.g., by a spring. The electrode plates may have comb projections. A post may be coupled at one of its ends to the top of one of the moveable electrode plates, and the post's other end is coupled to a plate, e.g., a mirror or other structure to be moved.

28 Claims, 6 Drawing Sheets

TORSIONAL ELECTROSTATIC ACTUATOR

The U.S. Government has a paid-up license in this invention and the right in limited circumstances to require the patent owner to license others on reasonable terms as provided for by the terms of contract No. HR0011-04-C-0048 awarded by DARPA under CCIT.

TECHNICAL FIELD

This invention relates to Micro-Electro-Mechanical-Systems (MEMS) devices, and more particularly, to torsional electrostatic actuators for moving one or more parts of a MEMS device.

BACKGROUND OF THE INVENTION

Electrostatic actuators for MEMS devices are well know. Such actuators typically include two plates that are attracted to each other when they are biased with a voltage difference. Comb drives are modified versions of such plate electrostatic actuators that use plates from which overlapping protrusions know as combs extend. See for example, U.S. Pat. No. 6,872,947. Torsional electrostatic actuators typically have one plate fixed and one that is free to rotate about an axis, often by virtue of being connected to a softer element, e.g., a spring of some type, at the axis point.

SUMMARY OF THE INVENTION

It is known in certain applications to couple multiple comb drives together to increase the torque that is produced for any given voltage. Typically, the coupling of comb drives is used for achieving piston motion. We have recognized that there are applications where it is desirable to be able to couple multiple drives, e.g., planar or comb drives, together to cause rotation about a single axis. This may be achieved, in accordance with the principles of the invention, by an arrangement in which two moveable electrode plates flank, i.e., are each located on opposite sides of, a fixed electrode plate such that the opposite direction rotations of the two moveable electrode plates, each about its respective rotation axis, are combined to produce a greater torque for the rotation about each of the axes than could be achieved if only a single electrode plate was employed. The electrode plates may have comb projections.

More particularly, in one embodiment of the invention, moveable electrode plates that are rotatably coupled to a substrate flank a stationary fixed electrode plate. Each of the moveable electrode plates is held offset from the substrate by at least one spring that couples it to a support structure such as a post or a wall. Each electrode plate has at least one arm extending therefrom in the direction of the other electrode plate. A post may be coupled at one of its ends to the top of one of the moveable electrode plates, and the post's other end is coupled to a plate, e.g., a mirror or other structure to be moved. At least one arm from at least one of the moveable electrode plates is connected to at least one arm of a moveable electrode plate on the opposite side of the fixed electrode plate, e.g., by a spring.

Operationally, when a voltage is applied between the moveable electrode plates and the fixed electrode plate, the attraction of the moveable electrode plates to the fixed electrode plate causes each of the moveable electrode plates to each rotate about its respective rotation axis. Preferably, the axes of rotation are parallel. The moveable electrode plates rotate so that the edge of each plate that is closest to the substrate moves upward away from the substrate and toward the fixed electrode. The rotation of the opposite end of the moveable electrode plate, which is connected to the support springs, tilts the post the plate coupled thereto. A corresponding rotation is induced in each of the coupled arms, which causes the force being exerted between the moveable electrode plates to be combined together. The point at which the arms are coupled thus rises.

Alternatively, the two arms coupled by a spring may be replaced by a single flexible so-called "deformable spring bar" which essentially embodies the arms and springs as sections of the bar and performs the same function as the arms and springs. Further alternatively, instead of a single fixed plate electrode, separate electrodes each facing one of the moveable plates may be employed.

DETAILED DESCRIPTION

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for. Applicant thus regards any means which can provide those functionalities as equivalent as those shown herein.

Unless otherwise explicitly specified herein, the drawings are not drawn to scale.

The term micro-electromechanical systems (MEMS) device as used herein is intended to mean an entire MEMS device or any portion thereof Thus, if a portion of a MEMS device is inoperative, or if a portion of a MEMS device is occluded, such a MEMS device is nonetheless considered to be a MEMS device for purposes of the present disclosure.

In the description, identically numbered components within different ones of the FIGs. refer to the same components.

Figure 1:
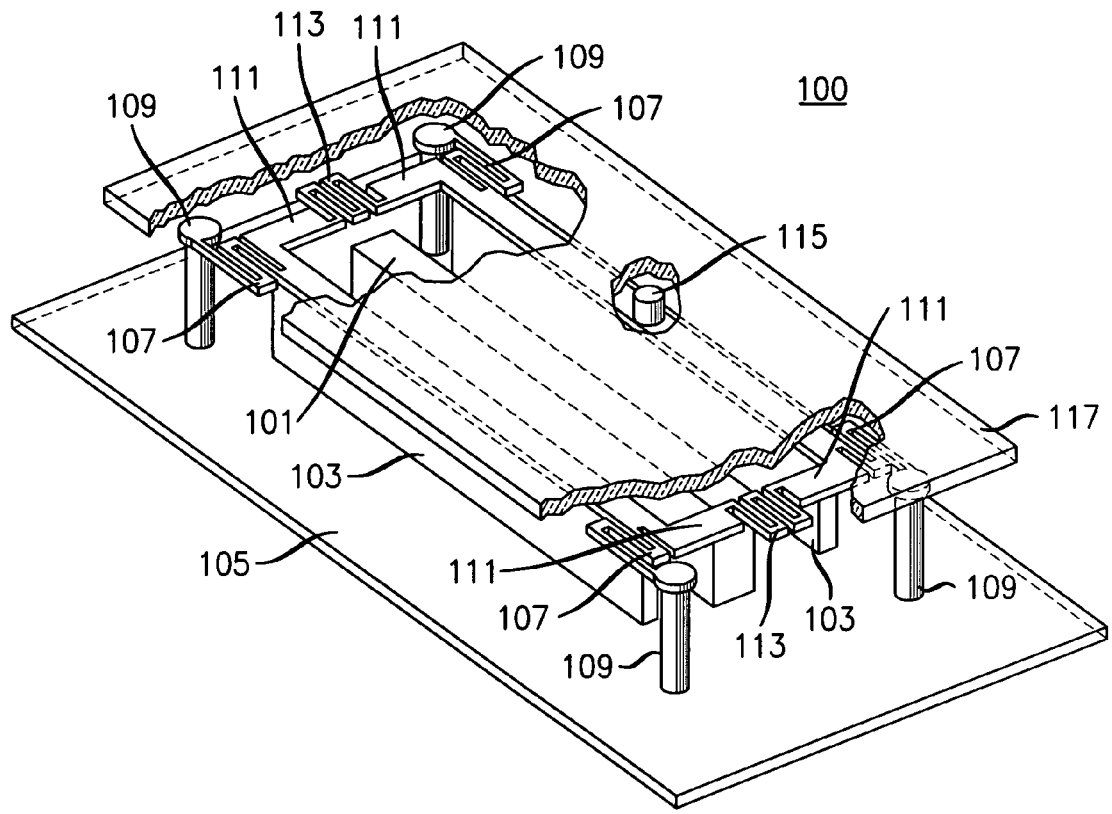
FIG. 1 shows an exemplary arrangement in which two moveable electrode plates flank a fixed electrode plate such that the opposite direction rotations of the two moveable electrode plates, each about its respective rotation axis, are combined to produce a greater torque for the rotation about each of the axes than could be achieved if only a single electrode plate was employed, in accordance with the principles of the invention.

FIG. 1 shows exemplary arrangement 100 in which two moveable electrode plates flank a fixed electrode plate such that the opposite direction rotations of the two moveable electrode plates, each about its respective rotation axis, are combined to produce a greater torque for the rotation about each of the axes than could be achieved if only a single electrode plate was employed, in accordance with the principles of the invention. Shown in FIG. 1 are a) fixed electrode 101, b) moveable electrodes 103, c) substrate 105, d) springs 107, e) posts 109, f) arms 111, g) springs 113, h) post 115, and i) plate 117.

A drive is formed by the combination of fixed electrode 101 and moveable electrodes 103. More particularly, fixed electrode 101 is attached to substrate 105 while moveable electrodes 103 flank, i.e., are each located on opposite sides of, fixed electrode 101. Moveable electrodes 103 are rotatably coupled to substrate 105. This is achieved, in the embodiment of the invention shown in FIG. 1, by having each of the moveable electrodes 103 held offset from substrate 105 by at least one of springs 107. To this end, each of springs 107 is attached at one of its ends to moveable electrodes 103 and at its opposite end to one of posts 109. Thus, together springs 107 and posts 109 act as supports for moveable electrodes 103.

Each of arms 111 extends from the one of moveable electrodes 103 to which it is attached in the direction of the other one of moveable electrodes 103. Post 115 is coupled at one of its ends to one of moveable electrodes 103, and in particular, to the surface of the one of electrodes 103 that is opposite the surface closest to substrate 105. The other end of post 115, which is not attached to a one of moveable electrodes 103, is coupled to a plate, e.g., a mirror, or other structure that is to be moved. Respective pairs of oppositely facing arms 111 from each of moveable electrodes 103 are connected to each other by a respective one of springs 113.

Note that, as will be readily recognized by those of ordinary skill in the art, for proper operation, fixed electrode 101 needs to be electrically isolated from moveable electrodes 103.

Figure 2:
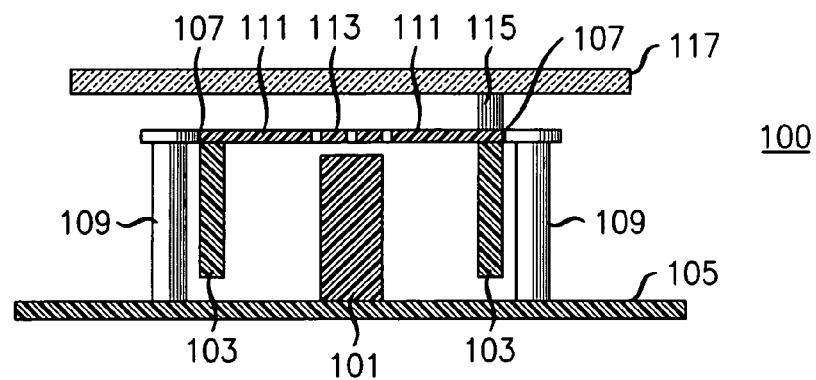
FIG. 2 shows a side view of the arrangement shown in FIG. 1.

FIG. 2 shows a side view of the arrangement shown in FIG. 1.

Those of ordinary skill in the art will readily recognize that post 115 may be made so wide as to be considered a wall, or even an extension of the one of moveable electrodes 103 to which it is attached.

Figure 3:
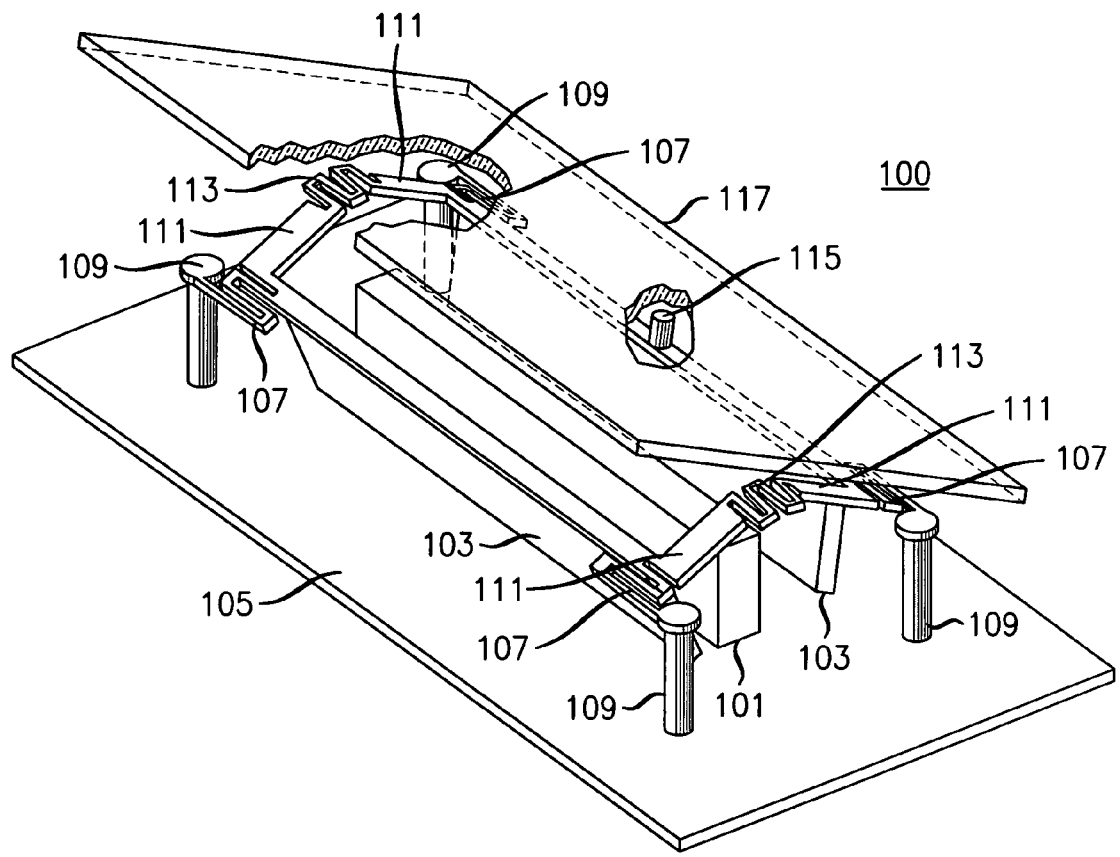
FIG. 3 shows the arrangement of FIG. 1 but where the moveable electrodes have been energized with a voltage difference between themselves and the fixed electrode.

FIG. 3 shows the arrangement of FIG. 1 but where moveable electrodes 103 have been energized with a voltage difference between themselves and fixed electrode 101, so as to cause movable electrodes 103 to move with respect to their resting position as shown in FIG. 1. As a result of such movement, arms 111 and springs 113 form an upside-down "U" shape. This is more clearly seen in FIG. 4, which, similar to FIG. 2, shows a side view of the arrangement of FIG. 1, but in FIG. 4 moveable electrodes 103 have been energized with a voltage difference between themselves and fixed electrode 101, so as to cause movable electrodes 103 to move with respect to their resting position as shown in FIG. 1.

Figure 5:
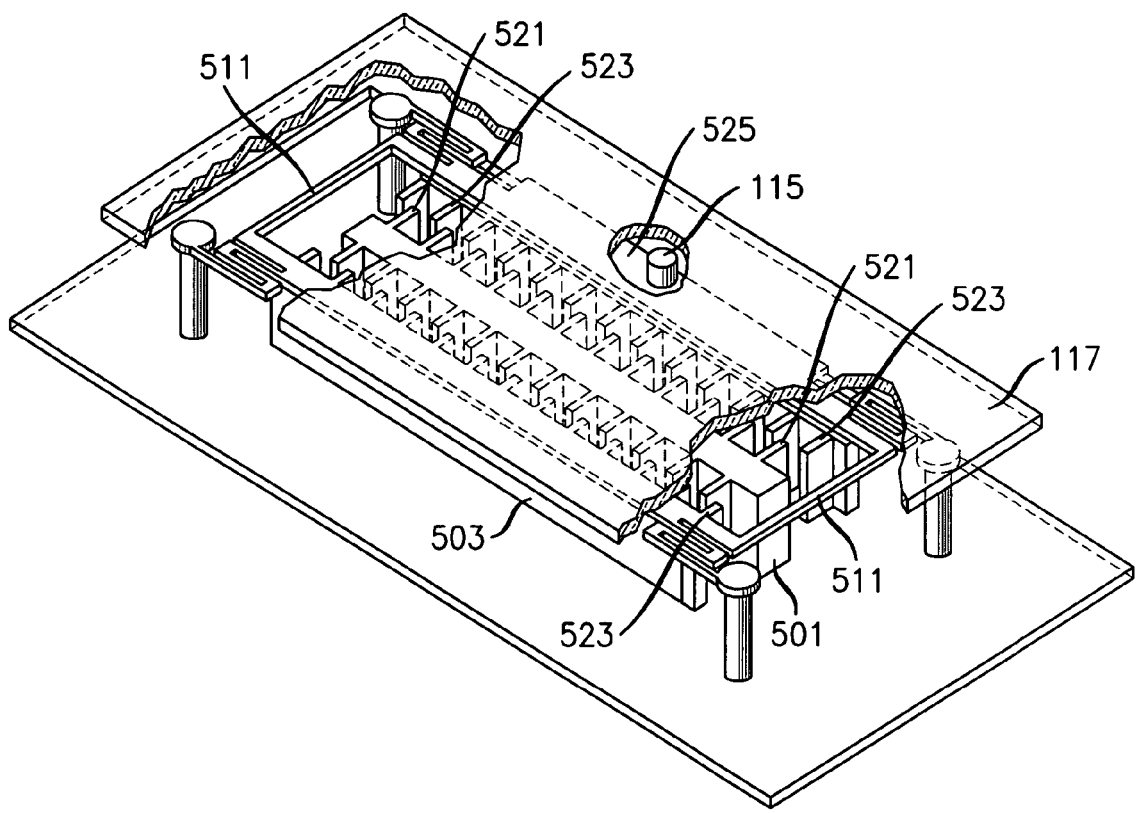
FIG. 5 shows another exemplary embodiment of the invention, which is similar to the shown in FIG. 1, but in which the electrodes are comb electrodes.

FIG. 5 shows another exemplary embodiment of the invention, which is similar to the emodiment of the invention shown in FIG. 1, except that rather than electrodes 101 and 103 being plate electrodes, they are each comb electrodes. In particular, fixed electrode 101 has been replaced by fixed electrode 501, which sports comb projections, i.e., comb teeth, 521, and each of moveable electrodes 105 have been replaced with moveable electrodes 503, each of which likewise sports comb projections, i.e., teeth, 523.

Advantageously, comb electrodes are able to provide more torque per volt. Further advantageously, when electrodes with combs are combined to form a comb drive, the force of a comb drive is linear with the square of the applied voltage and use of comb drives minimizes the likelihood of undesirable snapdown occurring.

Those of ordinary skill in the art will readily recognize that only one of movable electrodes 503, and its corresponding associated side of fixed electrode 501 may have comb teeth.

Figure 4:
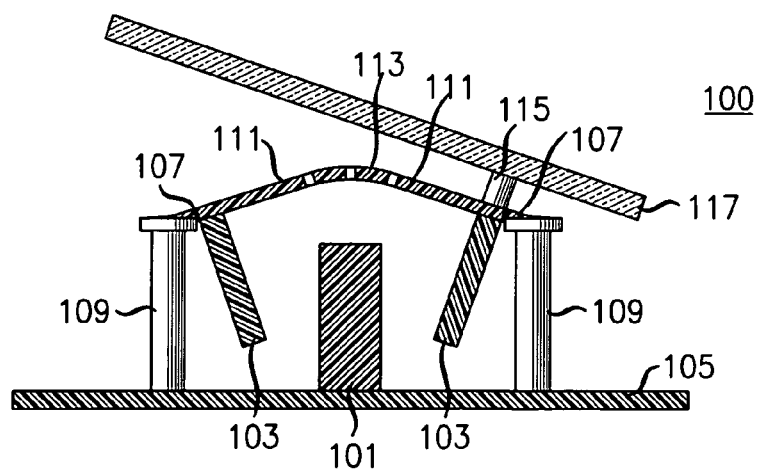
FIG. 4 shows a side view of the arrangement of FIG. 1 when the moveable electrodes are energized with a voltage difference between themselves and the fixed electrode.

In addition, FIG. 5 shows a further possible feature of the invention in the replacement of arms 109 and springs 111 by flexible spring bars 511. Functionally, spring bars 511 flex to form an upside-down "U" shape in the same manner that arms 109 and springs 111 formed an upside-down "U" as shown in FIGS. 3 and 4. Those of ordinary skill in the art will readily be able to design such spring bars. Note that, as will be readily recognized by those of ordinary skill in the art, use of spring bars are not required when comb teeth are employed, nor is the reverse true. Instead, use of comb teeth and spring bars are independent of each other.

One additional possible feature of the invention also shown in FIG. 5 is ledge 525, which is an extension of the top of moveable electrode 503 and couples moveable electrode 503 to post 115. Use of ledge 525 provides for additional area to attach post 525, should moveable electrode 503 be too narrow to accommodate the circumference of post 115. Ledge 525 may also provide some vertical displacement of plate 117 in that post 115 may be offset from moveable electrode 503.

Again, those of ordinary skill in the art will readily recognize that use of ledge 535 is independent of the use of comb plates or spring bars.

Figure 6:
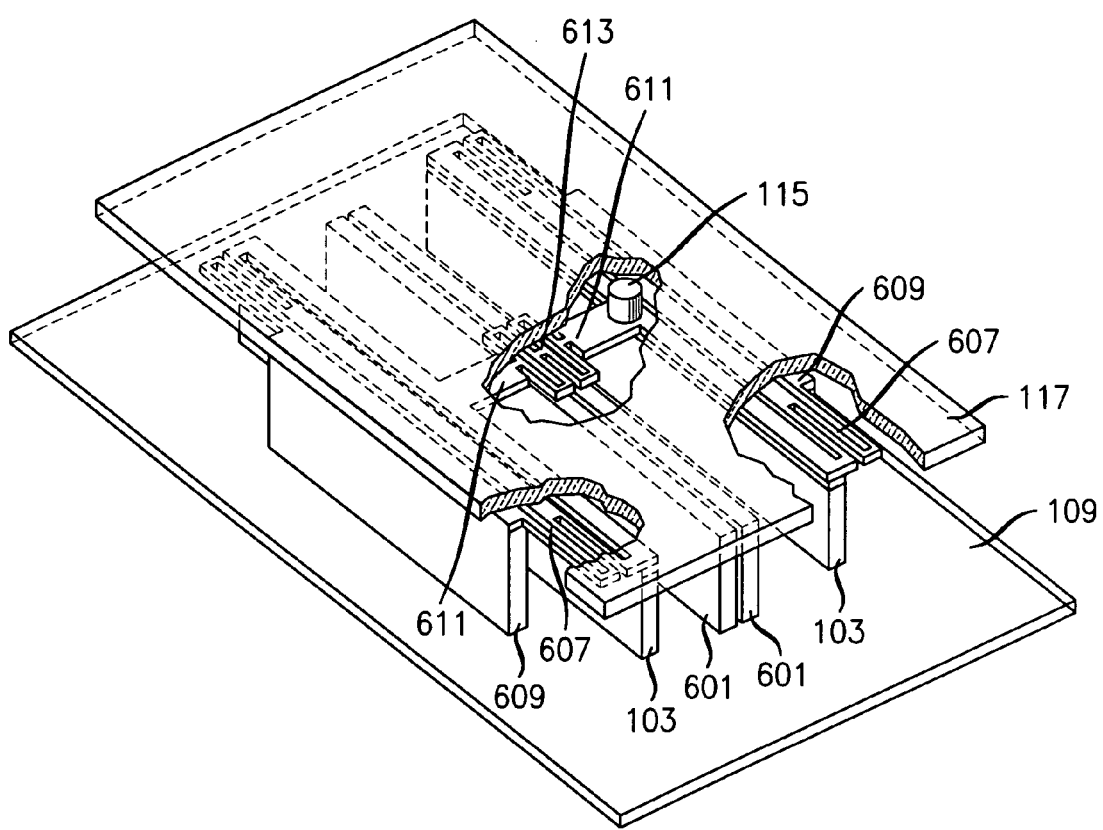
FIG. 6 shows another exemplary embodiment of the invention.

FIG. 6 shows another exemplary embodiment of the invention, which is similar to the embodiment of the invention shown in FIG. 1. However, in FIG. 6, posts 109 of FIG. 1 have been replaced by walls 609. Correspondingly springs 107 have been replaced by springs 607. Additionally, rather than use two sets of arms 111 for each of moveable electrodes 103, a single pair of arms 611 is employed, one arm extending from each of moveable electrodes 103. These arms are coupled by spring 613. As such, arms 611 may be centered along the length of moveable electrodes 103. Also, depending on the design requirements, as will be readily recognized by those of ordinary skill in the art, arms 611 may be thicker than similar arms 111, spring 613 may be thicker than any of springs 113.

Note that, as will be readily recognized by those of ordinary skill in the art, the replacement of posts by walls and the use of only one arm extending from each of moveable electrodes 103 are elements of embodiments of the invention that are independent of each other.

Another possible feature of the invention shown in FIG. 6 is the use of two fixed plate electrodes 601 in place of the single fixed plate electrode 101 employed in FIG. 1. Fixed plate electrodes 601 may, but need not be, connected to the same voltage. To this end, it may be necessary to fabricate one or more of fixed plate electrodes 601 electrically isolated from substrate 105.

Again, those of ordinary skill in the art will readily recognize that use of two fixed plate electrodes is independent of the number of arms used to couple the moveable electrodes, as well as being independent of the use of a wall as a support structure.

FIGS. 7-14 show the results after various processing steps that are undertaken to fabricate a structure such as structure 100 shown in FIG. 1. Each of FIGS. 7-14 are side views showing the results after various layers are deposited and etched.

Figure 7:
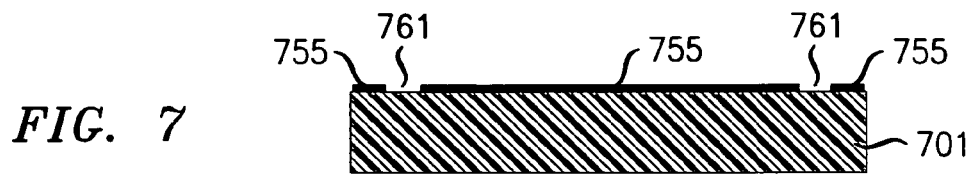
FIGS. 7-14 show the results after various processing steps that are undertaken to fabricate a structure such as is shown in FIG. 1.
Figure 8:
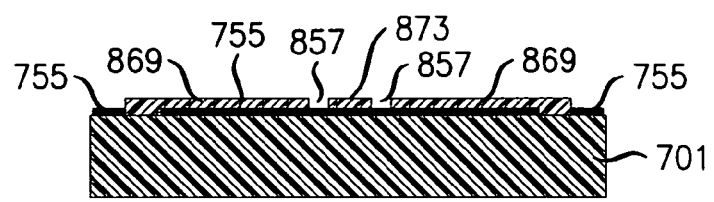

Initially, the process starts with a wafer e.g., wafer 701, known as the handle wafer, on which a thin, e.g., 0.5 micron thick, layer of insulating material 755, e.g., silicon nitride, is deposited. Thereafter, holes 761 are patterned and then etched through insulating material 755 down to wafer 701. Holes 761, are positioned to expose a portion of wafer 701 itself so that a contact may be made through the hole down to wafer 701 itself. FIG. 7 shows handle wafer 701 after the depositing and etching of layer 755 to from holes 761.

Thereafter, a thin, e.g., 0.5 microns thick, layer of polysilicon 869 is deposited over the entire surface of the structure that is on top of wafer 701. Doing so fills in previously-made holes 761 (FIG. 7) in silicon nitride layer 755. Part of polysilicon layer 869 (FIG. 8) is thus electrically connected to handle wafer 701, which is typically grounded. Polysilicon layer 869 is patterned and etched to form the structure shown in FIG. 8. The etching is stopped once the underlying silicon nitride layer 755 is reached, thereby forming holes 857. As a result of the etching, the center of layer 869, now "island" 873, is electrically isolated from the rest of wafer 701. Island 873 will eventually be part of fixed electrode 101 (FIG. 1). This layer can also be used to define wires connecting island 873 to external bond pads (not shown).

A thin, e.g., 0.5 to 1 micron thick, layer of insulating material 975, e.g., silicon-oxide, is deposited over the entire surface of the structure that is now on top of wafer 701. Thereafter, holes 977, are patterned onto insulating material 975 and then etched therethrough. The result is shown in FIG. 9.

Figure 9:
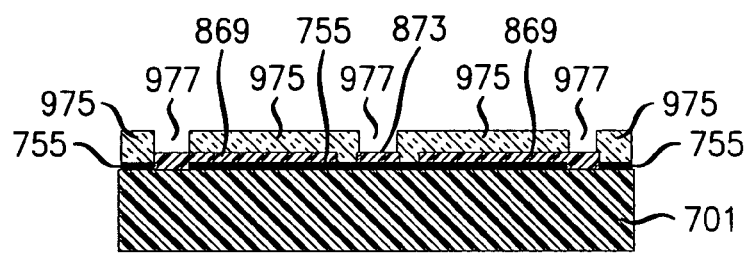

A thicker, e.g., between 5 and 10 microns in thickness, layer of polysilicon 1081 is deposited over the entire surface of the structure shown in FIG. 9 that is now on top of wafer 701, filling in the previously-made holes 977 in insulating material 975. The polysilicon is patterned and etched so that the portion of polysilicon 1081 remaining after completion of the etching will be part of fixed electrode 101 (FIG. 1) moveable electrodes 103, and posts 115. The etching is stopped upon reaching insulating material 975 (FIG. 9). Doing so leaves behind in polysilicon 1081 in the pattern shown in FIG. 10.

Figure 10:
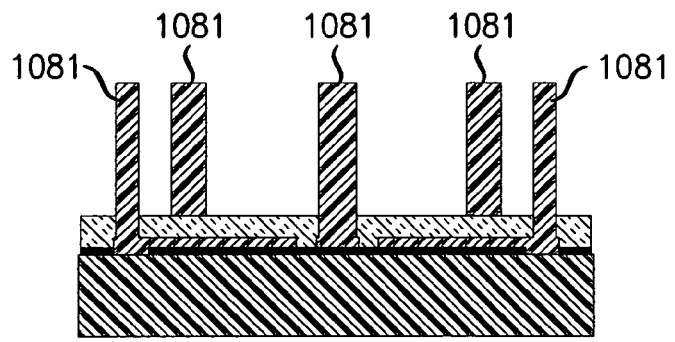

A thick, e.g., at least as thick as polysilicon 1081 and preferably at least somewhat thicker, silicon oxide layer 1185 is deposited over the entire surface of the structure shown in FIG. 10, so as to fill in the cavities created by the previous etching of polysilicon layer 1081. The top surface of silicon oxide layer 1185 is polished, e.g., using a well-known chemical-mechanical polishing (CMP) technique, with the polishing stopping when the height of the structures of the polysilicon layer 1081 is encountered. This result is seen in FIG. 11 up to the line of height of the pillars formed of polysilicon 1081.

A thin, e.g., 1 micron in thickness, silicon oxide layer 1187 is deposited on the polished surface. The thin silicon oxide is patterned for holes 1189 and then etched according to the pattern down to the height of polysilicon layer 1185, thereby forming holes 1189 that reach down through the silicon oxide to the polysilicon layer 1081 to form the structure shown in FIG. 11.

Figure 11:
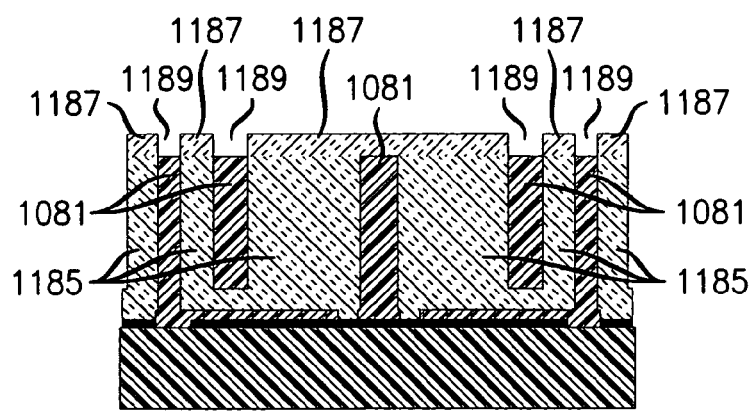

A conformal polysilicon layer 1291, e.g., between 0.5 and 2 microns thick, is deposited over the entire surface of the structure shown in FIG. 11. In addition to coating the surface, the polysilicon reaches down and fills holes 1189 in silicon oxide layer 1187 to connect to polysilicon layer 1081. Conformal polysilicon layer 1291 is then patterned and etched to form arms 111 and springs 107 and 113 (FIG. 1) or deformable spring bars 511 (FIG. 5). A side view after etching is shown in FIG. 12.

Figure 12:
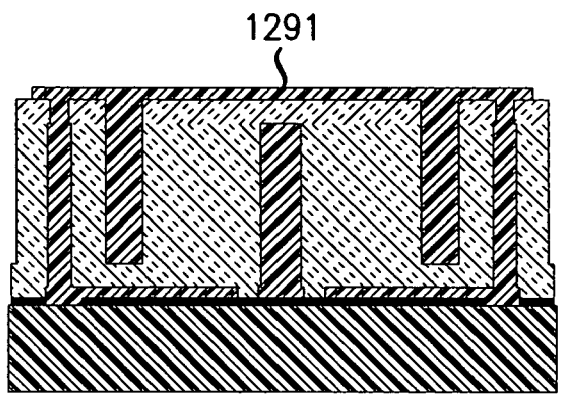
Figure 13:
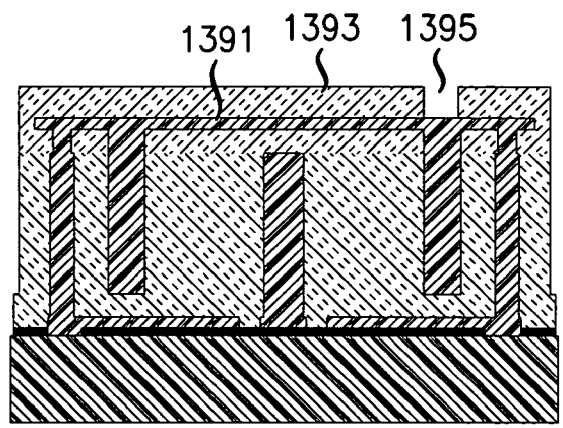

Silicon oxide layer 1393, again a thin layer e.g., having a thickness of a micron or less, is deposited over the entire surface of the structure shown in FIG. 12. A hole 1395, is patterned and etched into silicon oxide layer 1393, stopping at the height of conformal polysilicon layer 1291, as shown in FIG. 13. Hole 1395 is employed to form post 115 (FIG. 1) which couples plate 117 to one of moveable electrodes 103.

Post 115 and plate 117 are formed by depositing polysilicon layer 1497, which is, for example, about one micron thick, over the entire surface of the structure shown in FIG. 13. Doing so also fills in hole 1395 so that it connects to the underlying polysilicon layer 1291.

Figure 14:
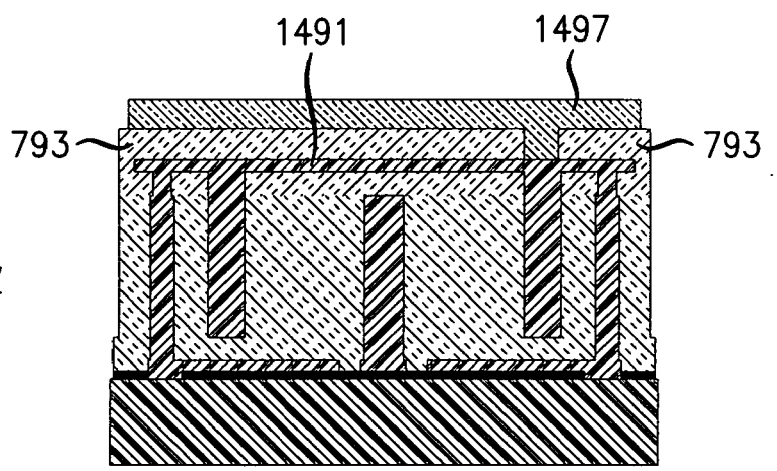

Optionally, a polishing operation, e.g., another CMP polishing, is performed on polysilicon layer 1497 to produce a flat surface for plate 117, such as may be suitable for use as a mirror. The edge of plate 117 must be cut back by patterning and etching to allow a wet etch solution into which the structure is next bathed to have access to silicon oxide layer 1185. The wet etch bath removes substantially all the silicon oxide applied during the above-described steps so as to release the polysilicon structure. FIG. 14 shows the structure just prior to release. An exemplary wet etch solution is hydrofluoric acid.

Those of ordinary skill in the art will readily recognize how the various steps and different patterns may be combined to create different versions of the mirror structure, such as those described hereinabove.

What is claimed is:

1. Apparatus comprising:
   a first moveable plate electrode held offset from a substrate;
   a second moveable plate electrode held offset from said substrate;
   a fixed plate electrode, said fixed plate electrode being flanked by said first and second moveable plate electrodes so that a voltage difference between said fixed plate electrode and said first moveable plate electrode causes movement of said first moveable plate electrode and a voltage difference between said fixed plate electrode and said second moveable plate electrode causes movement of said second moveable plate electrode;
   a first arm portion, coupled to said first moveable plate electrode and extending toward said second moveable plate electrode;
   a second arm portion, coupled to said second plate and extending toward said first moveable plate electrode; and
   a coupler coupling said first and second arms to each other.

2. The invention as defined in claim 1 wherein at least one of said first and said second moveable plate electrodes is held offset from said substrate by at least a first spring that couples said first moveable plate electrode to a support structure.

3. The invention as defined in claim 2 wherein said support structure is a post.

4. The invention as defined in claim 2 wherein said support structure is a wall.

5. The invention as defined in claim 1 wherein said coupler is a spring.

6. The invention as defined in claim 1 wherein said first moveable plate electrode rotates about a first axis.

7. The invention as defined in claim 6 wherein said second moveable plate electrode rotates about a second axis parallel to said first axis.

8. The invention as defined in claim 6 wherein said first moveable plate electrode is held offset from said substrate by at least a first spring and a second spring and said first axis is defined by a line between said first and second springs.

9. The invention as defined in claim 6 wherein said first moveable plate electrode is held offset from said substrate by at least a first spring, said first spring having multiple turns, and said first axis is in a plane defined by said spring and located parallel to the middle of said turns.

10. The invention as defined in claim 1 wherein said first arm, said second arm, and said coupler are respective sections of a deformable spring bar.

11. The invention as defined in claim 1 wherein said fixed plate on at least one side has comb projections, as does the side that faces said comb projections of at least one of said first and second movable plates.

12. The invention as defined in claim 1 wherein at least one of said first and second moveable plate electrodes has comb projections, as does at least a portion of said fixed electrode plate facing said comb projections.

13. The invention as defined in claim 1 wherein said fixed plate electrode is implemented as two separate fixed plate electrodes.

14. The invention as defined in claim 13 wherein said two separate fixed plate electrodes are electrically coupled.

15. The invention as defined in claim 1 further comprising a plate that is coupled to a surface of one of said first and second moveable plate electrodes, said surface being the one that is furthest from said substrate.

16. The invention as defined in claim 1 further comprising a post having two ends, a first of said two ends being coupled to a surface of one of said first and second moveable plate electrodes, said surface being the one that is furthest from said substrate.

17. The invention as defined in claim 16 further comprising a plate coupled to said second end of said post.

18. The invention as defined in claim 17 wherein said plate coupled to said second end of said post is a mirror.

19. The invention as defined in claim 17 wherein rotation of said one of said first and second moveable plate electrodes causes said plate coupled to said second end of said post to tilt.

20. The invention as defined in claim 16 further comprising a ledge coupled to said surface of one of said first and second moveable plate electrodes that is furthest from said substrate, wherein said first end of said post is coupled to said ledge.

21. Apparatus comprising:
a first moveable plate held offset from a substrate;
a second moveable plate held offset from said substrate;
a fixed plate, said fixed plate being flanked by said first and second moveable plates; and
torque coupling means for transferring at least a portion of the torque caused by rotation of one of said first and second moveable plates to the other of said first and second moveable plates;
wherein at least one of said first and second moveable plates are held offset from said substrate by at least a spring that couples said one of said first and second moveable plates to a support structure.

22. The invention as defined in claim 21 wherein said torque coupling means comprises:
a first arm coupled at one end at said first plate and extending toward said second plate;
a second arm coupled at one end at said second plate and extending toward said first plate; and
a spring coupling said first and second aims.

23. The invention as defined in claim 21 wherein said torque coupling means comprises a deformable spring bar.

24. The invention as defined in claim 21 wherein at least one of said fixed first and second moveable plates and at least one surface of said fixed plate have comb projections.

25. The invention as defined in claim 21 further comprising a plate coupled to a surface of one of said first and second moveable plates, said surface being the one that is furthest from said substrate.

26. The invention as defined in claim 25 wherein said plate coupled to said surface of one of said first and second moveable plates is coupled thereto by a support that is one of the set consisting of a post and a wall.

27. A method of operating a torsional electrostatic actuator that includes
a first moveable plate held offset from a substrate;
a second moveable plate held offset from said substrate;
a fixed plate, said fixed plate being flanked by said first and second moveable plates;
a first arm portion, coupled to said first plate and extending toward said second plate;
a second arm portion, coupled to said second plate and extending toward said first plate; and
a coupler coupling said first and second arm portions to each other,
the method comprising the steps of:
rotating each of said first and second moveable plates about its respective rotation axis so that the edge of each of said first and second plates that is closest to said substrate moves upward away from said substrate and toward said fixed plate;
whereby a torque produced by said first fixed plate is coupled to said second fixed plate via said first arm, said coupler, and said second arm.

28. The invention as defined in claim 27 wherein said rotating step further comprises the step of applying a voltage difference between said fixed plate and each of said first and second moveable plates.

* * * * *